US012759133B2

(12) United States Patent

Hoxha et al.

(10) Patent No.: US 12,759,133 B2

(45) Date of Patent: Oct. 13, 2026

(54) SYSTEM AND METHOD FOR MANIPULATING AN OMNIDIRECTIONAL CART USING AN ARMED ROBOT

(71) Applicant: Toyota Motor Engineering & Manufacturing North America, Inc., Plano, TX (US)

(72) Inventors: Bardh Hoxha, Canton, MI (US); Georgios Fainekos, Novi, MI (US); Hideki Okamoto, Ann Arbor, MI (US); Danil V. Prokhorov, Canton, MI (US); Mitchell Black, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 6 days.

(21) Appl. No.: 18/983,979

(22) Filed: Dec. 17, 2024

(65) Prior Publication Data

US 2026/0166711 A1 Jun. 18, 2026

(51) Int. Cl.

*B25J 9/16* (2006.01)
*B25J 5/00* (2006.01)
*B25J 11/00* (2006.01)

(52) U.S. Cl.

CPC ............... *B25J 5/007* (2013.01); *B25J 9/161* (2013.01); *B25J 9/1664* (2013.01); *B25J 9/1679* (2013.01); *B25J 11/008* (2013.01)

(58) Field of Classification Search

CPC . B25J 5/007; B25J 9/161; B25J 9/1664; B25J 9/1679; B25J 11/008; B25J 9/163; B25J 9/1669

See application file for complete search history.

(56) References Cited

U.S. PATENT DOCUMENTS

| | | | | |
|---|---|---|---|---|
| 10,065,306 | B2 | 9/2018 | Isobe | |
| 2023/0415331 | A1 * | 12/2023 | Larsson | B25J 9/0093 |
| 2024/0272636 | A1 | 8/2024 | Black et al. | |

(Continued)

OTHER PUBLICATIONS

Vaz Material_Handling_by_Humanoid_Robot_While_Pushing_Carts_Using_a_Walking_Pattern_Based_on_Capture_Point.pdf (Jean Chagas Vaz and Paul Oh, Material Handling by Humanoid Robot While Pushing Carts Using a Walking Pattern Based on Capture Point, 2020, IEEE, pp. 9796-9801) (Year: 2020).*

(Continued)

*Primary Examiner* — Bao Long T Nguyen

(74) *Attorney, Agent, or Firm* — Christopher G. Darrow; Darrow Mustafa PC

(57) ABSTRACT

Systems and methods for manipulating an omnidirectional cart using an armed mobile robot are described herein. In one example, a system includes a processor and a memory in communication with the processor. The memory includes instructions that, when executed by the processor, cause the processor to determine a control input for controlling a mobile robot with at least two arms configured to manipulate an omnidirectional cart. The control input is based on the trajectory and the state of the mobile robot when the at least two arms are manipulating the omnidirectional cart. Once the control input is determined, the system then controls the movement of the mobile robot using the control input.

17 Claims, 5 Drawing Sheets

(56) References Cited

U.S. PATENT DOCUMENTS

2025/0298413 A1 * 9/2025 Terada .................. B66F 9/0755

OTHER PUBLICATIONS

Bylers, Alex, "Autonomous towing robots speeding up material handling", Retrieved from the Internet: <https://www.drivesweb.com/autonomous-towing-robots-speeding-up-material-handling>, retrieved Jun. 17, 2024 (14 pages).
Takahashi, et al., "Development of A Mobile Robot pulling An Omni-directional Cart for A Construction Site", International Symposium on Automation and Robotics in Construction, 2020, 6 pages.
Evestedt, et al., "Motion planning for a reversing general 2trailer configuration using Closed-Loop RRT", International Conference on Intelligent Robots and Systems, 2016, 9 pages.
Kuwata, et al., "Real-Time Motion Planning With Applications to Autonomous Urban Driving", IEEE Transactions on control systems technology, 2009, 15 pages.
Aguilera, et al., "Modeling and inertial parameter estimation of cart-like nonholonomic systems using a mobile manipulator." IEEE International Conference on Robotics and Automation, 2023, 7 pages.
Periotto, et al., "MPC-CBF with Adaptive Safety Margins for Safety-critical Teleoperation over Imperfect Network Connections", arXiv preprint arXiv:2403.18650, 2024, 7 pages.
Wills, et al., "Barrier Function Based Model Predictive Control", Automatica, 2004, 205 pages.
Zeng, et al., "Enhancing Feasibility and Safety of Nonlinear Model Predictive Control with Discrete-Time Control Barrier Functions," IEEE Conference on Decision and Control, 2021, 8 pages.
Marvi, et al., :Safety planning using control barrier function: A model predictive control scheme, IEEE 2nd Connected and Automated Vehicles Symposium, 2019, 5 pages.
Aali, et al., "Multiple control barrier functions: An application to reactive obstacle avoidance for a multi-steering tractor-trailer system", IEEE 61st Conference on Decision and Control , 2022, 8 pages.
Tedrake, Russ, "Underactuated Robotics: Algorithms for Walking, Running, Swimming, Flying, and Manipulation (Course Notes for MIT 6.832)", Downloaded on Dec. 9, 2024 from <https://underactuated.csail.mit.edu/>, 12 pages.
Black, U.S. Appl. No. 18/486,324, filed Oct. 13, 2023.
Parwana, U.S. Appl. No. 18/477,965, filed Sep. 29, 2023.
Black, U.S. Appl. No. 18/108,453, filed Feb. 10, 2023.

* cited by examiner

SYSTEM AND METHOD FOR MANIPULATING AN OMNIDIRECTIONAL CART USING AN ARMED ROBOT

TECHNICAL FIELD

The subject matter described herein relates, in general, to systems and methods for manipulating an omnidirectional cart and, more specifically, to systems and methods for manipulating an omnidirectional cart using an armed robot.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

An omnidirectional cart is a type of vehicle designed to move in any direction without needing to turn. This is achieved through the use of specialized wheels that allow the omnidirectional cart to move forward, backward, sideways, and rotate in place. Due to their high maneuverability, omnidirectional carts are utilized in a number of different applications, such as manufacturing, warehousing, logistics, hospitals, and the like.

However, controlling the movement (i.e., manipulation) of an omnidirectional cart has its challenges. Moreover, ensuring the cart follows the same path as the robot can be difficult, as any deviation may lead to collisions with obstacles. Stability and balance are crucial, requiring precise control to prevent tipping or unsteady movements. Additionally, navigating dynamic environments with obstacles demands advanced motion planning and real-time adjustments.

SUMMARY

This section generally summarizes the disclosure and is not a comprehensive explanation of its full scope or all its features.

In one embodiment, a system includes a processor and a memory in communication with the processor. The memory includes instructions that, when executed by the processor, cause the processor to determine a control input for controlling a mobile robot with at least two arms configured to manipulate an omnidirectional cart. The control input is based on the trajectory and the state of the mobile robot. Once the control input is determined, the system then controls the movement of the mobile robot using the control input. The state of the mobile robot may be determined by using a robot-cart model that models interconnected dynamics between the omnidirectional cart and the mobile robot.

In another embodiment, a method includes the steps of determining a control input for controlling a mobile robot with at least two arms configured to manipulate an omnidirectional cart. Like before, the control input is based on a trajectory and the state of the mobile robot, which may be determined by using a robot-cart model that models interconnected dynamics model between the omnidirectional cart and the mobile robot. Once the control input is determined, the method then controls the movement of the mobile robot using the control input.

In yet another embodiment, a non-transitory computer-readable medium includes instructions that, when executed by a processor, cause the processor to determine a control input for controlling a mobile robot with at least two arms configured to manipulate an omnidirectional cart. Again, the control input is based on a trajectory and the state of the mobile robot, which may be determined by using a robot-cart model that models interconnected dynamics model between the omnidirectional cart and the mobile robot. Once the control input is determined, the instructions stored in the non-transitory computer-readable medium can then cause the processor to control the movement of the mobile robot using the control input.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described are systems and methods for controlling an armed mobile robot to manipulate an omnidirectional cart with the goal of enabling safe and efficient transportation of objects in various environments. Moreover, the systems and methods described herein consider the full interconnected dynamics model between an omnidirectional cart and an armed mobile robot and use these dynamics to optimize the planning and control algorithms for safe and efficient operation. The system and method may also utilize a Closed-Loop Rapidly-exploring Random Trees (CL-RRT) planner to generate global motion plans for the unstable system. CL-RRT improves upon traditional RRT by integrating feedback control mechanisms directly into the planning process, allowing for adaptive responses to dynamic changes and uncertainties in the environment.

Further, the systems and methods may incorporate model predictive control ("MPC") and predictive risk-aware control barrier functions ("PRA-CBFs"), i.e., MPC+PRA-CBFs. For example, the presence of other objects, renders the environment in which the omnidirectional cart is manipulated both dynamic and uncertain. As such, it is necessary for any controller to have a formal, mathematical understanding of the risk incurred by taking its computed actions and to be able to bound that risk according to some design tolerance. Accordingly, illustrative embodiments of the present disclosure introduce frameworks for accomplishing such tasks by using predictive, risk-aware control barrier functions.

Figure 1:
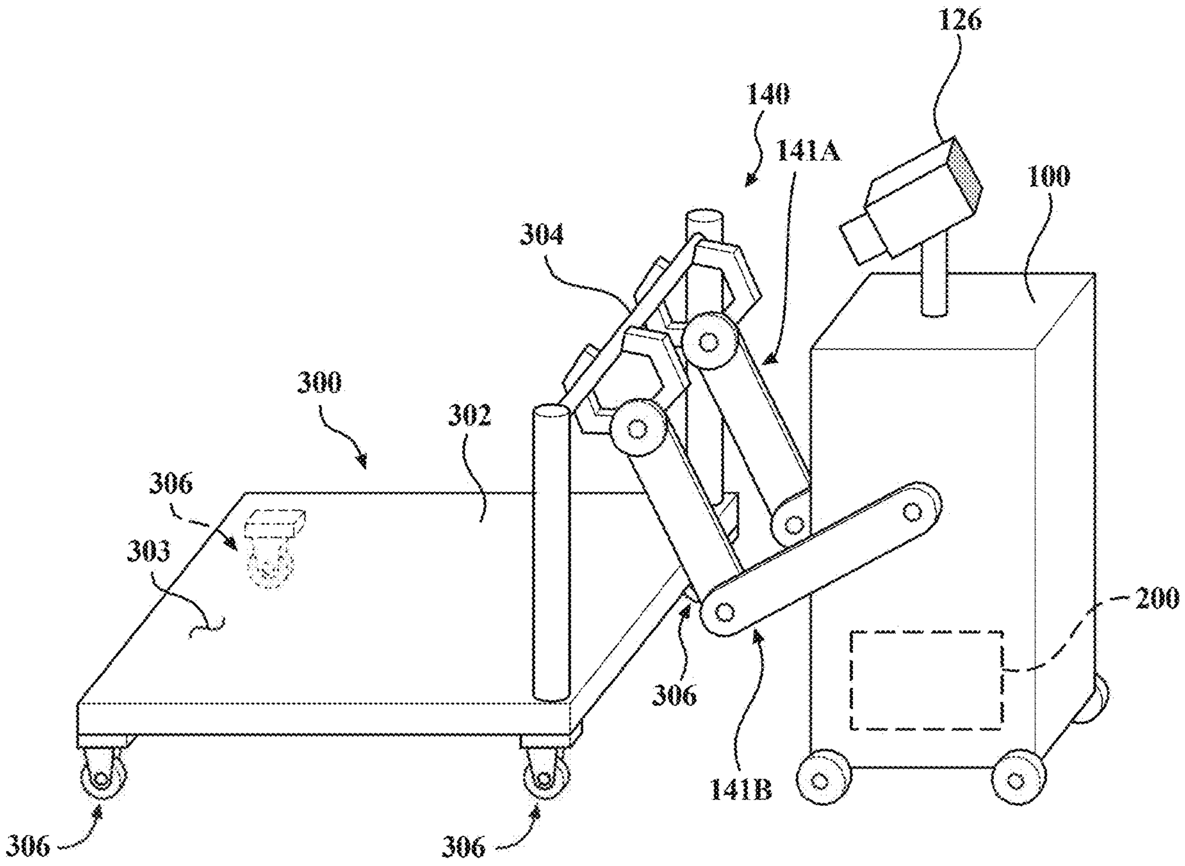
FIG. 1 illustrates one example of an armed mobile robot manipulating an omnidirectional cart.

FIG. 1 illustrates an example of a robot 100 that incorporates an omnidirectional cart manipulation system 200 that allows the robot 100 to manipulate the omnidirectional cart 300. Generally, the manipulation of the omnidirectional cart 300 by the robot 100 will be such that the robot 100 essentially moves the omnidirectional cart 300 from one location to another. The movement of the omnidirectional cart 300 may be in the form of a pushing action and/or pulling action.

The robot 100 manipulates the omnidirectional cart 300 utilizing at least two robotic devices 140, which may be in the form of arms 141A and 141B. As will be explained later in this description, the arms 141A and/or 141B may be made of different components such as links, joints, effectors, and actuators that allow the robot 100 to essentially connect itself to the omnidirectional cart 300 so as to be able to manipulate the omnidirectional cart 300.

The robot 100 may also include any one of a number of different sensors, including a camera(s) 126, which is shown in this example to be one or more forward-looking cameras. In particular, the camera(s) 126 can be used to capture images that can then be utilized by the omnidirectional cart manipulation system 200 or other systems of the robot 100 to predict the weight distribution of the omnidirectional cart 300, or the type of the omnidirectional cart 300 that is being pushed, and/or the angle between the arms 141A and/or 141B and the omnidirectional cart 300. In another application, the camera(s) 126 could be used as an estimator for the trajectory of the omnidirectional cart 300 if the robot 100 releases one or both of the arms 141A and/or 141B. Finally, images captured from the camera 126 may also be utilized by the omnidirectional cart manipulation system 200 to predict the future trajectory of the omnidirectional cart 300 and obstacles in the environment. As will be explained later, the robot 100 can also include other sensors such as LIDAR, radar, infrared sensors (for detecting and/or monitoring cold or warm products on the omnidirectional cart 300), or other structured light sensors.

The omnidirectional cart 300 can vary from application to application. As such, it should be understood that the omnidirectional cart 300 shown in FIG. 1 is just one example of the form the omnidirectional cart 300 may take. In this example, the omnidirectional cart 300 may include a platform 302 that at least partially defines a support surface 303 for the placement of objects that need to be transported from one location to another. Located on the opposing side of the platform 302 may be one or more wheel assemblies 306. The wheel assemblies 306 may have rollers mounted at an angle around their circumference, allowing them to move laterally, diagonally, and rotate on the spot. As such, this allows the omnidirectional cart 300 to move forward, backward, sideways, rotate in place, etc., giving the omnidirectional cart 300 a highly maneuverable design that can move in any direction without the need to turn.

The omnidirectional cart 300 may also include one or more handlebars 304 and/or grab locations that allow the arms 141A and 141B to connect to the omnidirectional cart 300 such that the arms 141A and 141B can manipulate the omnidirectional cart 300. In this example, the omnidirectional cart 300 includes a single long handlebar 304 that both the arms 141A and 141B can interact with. However, it should be understood that instead of utilizing a single handlebar 304, multiple handlebars and/or grab locations may be utilized and interacted with separately by the arms 141A and 141B of the robot 100.

Figure 2:
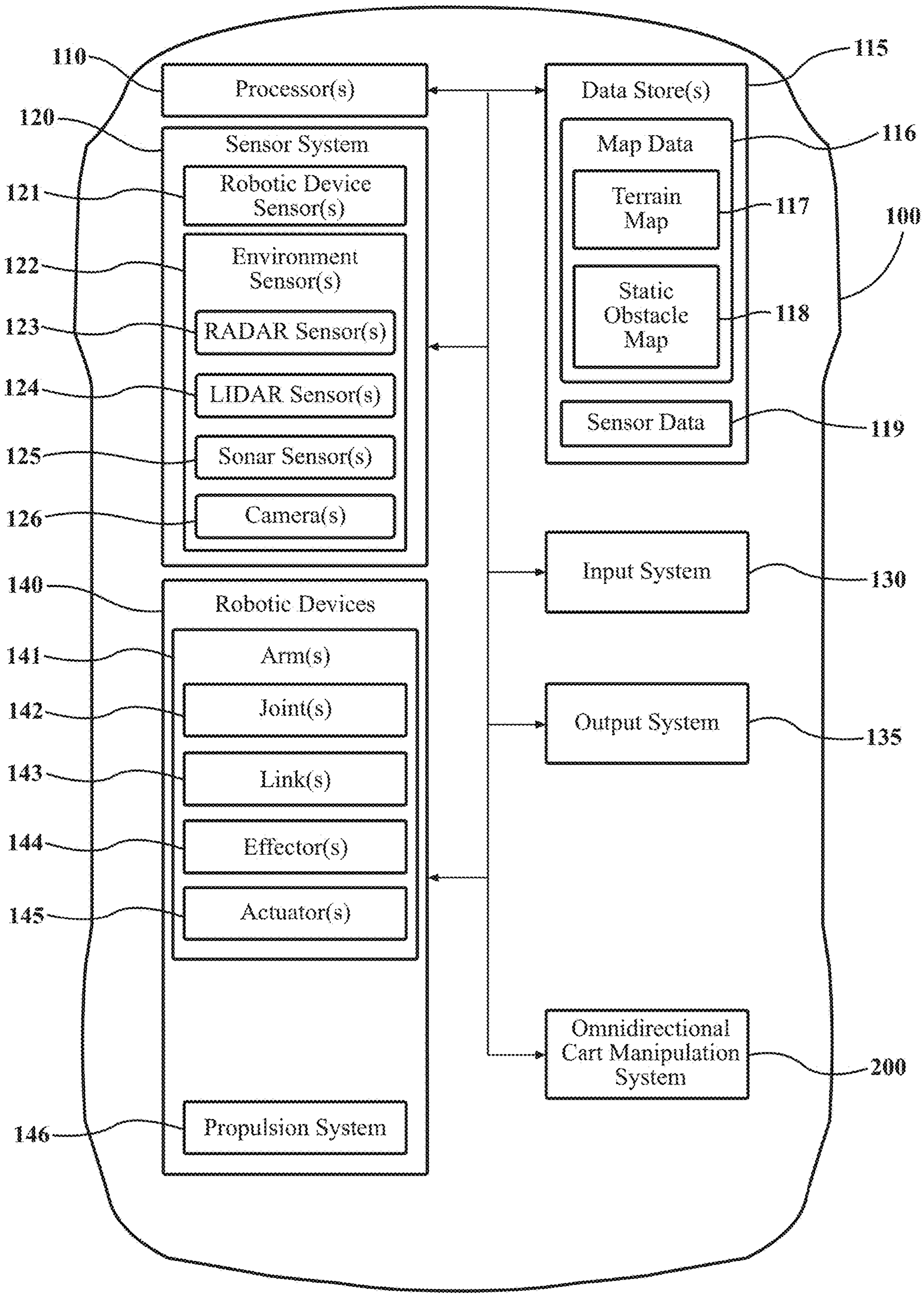
FIG. 2 illustrates a more detailed view of the armed mobile robot of FIG. 1.

Referring to FIG. 2, illustrated is a detailed block diagram of the robot 100. It will be understood that in various embodiments, it may not be necessary for the robot 100 to have all of the elements shown in FIG. 2. The robot 100 can have any combination of the various elements shown in FIG. 2. Further, the robot 100 can have additional elements to those shown in FIG. 2. In some arrangements, the robot 100 may be implemented without one or more of the elements shown in FIG. 2. While the various elements are shown as being located within the robot 100 in FIG. 2, it will be understood that one or more of these elements can be located external to the robot 100. Further, the elements shown may be physically separated by large distances and provided as remote services (e.g., cloud-computing services).

Some of the possible elements of the robot 100 are shown in FIG. 2 and will be described along with subsequent figures. However, a description of many of the elements in FIG. 2 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

Figure 3:
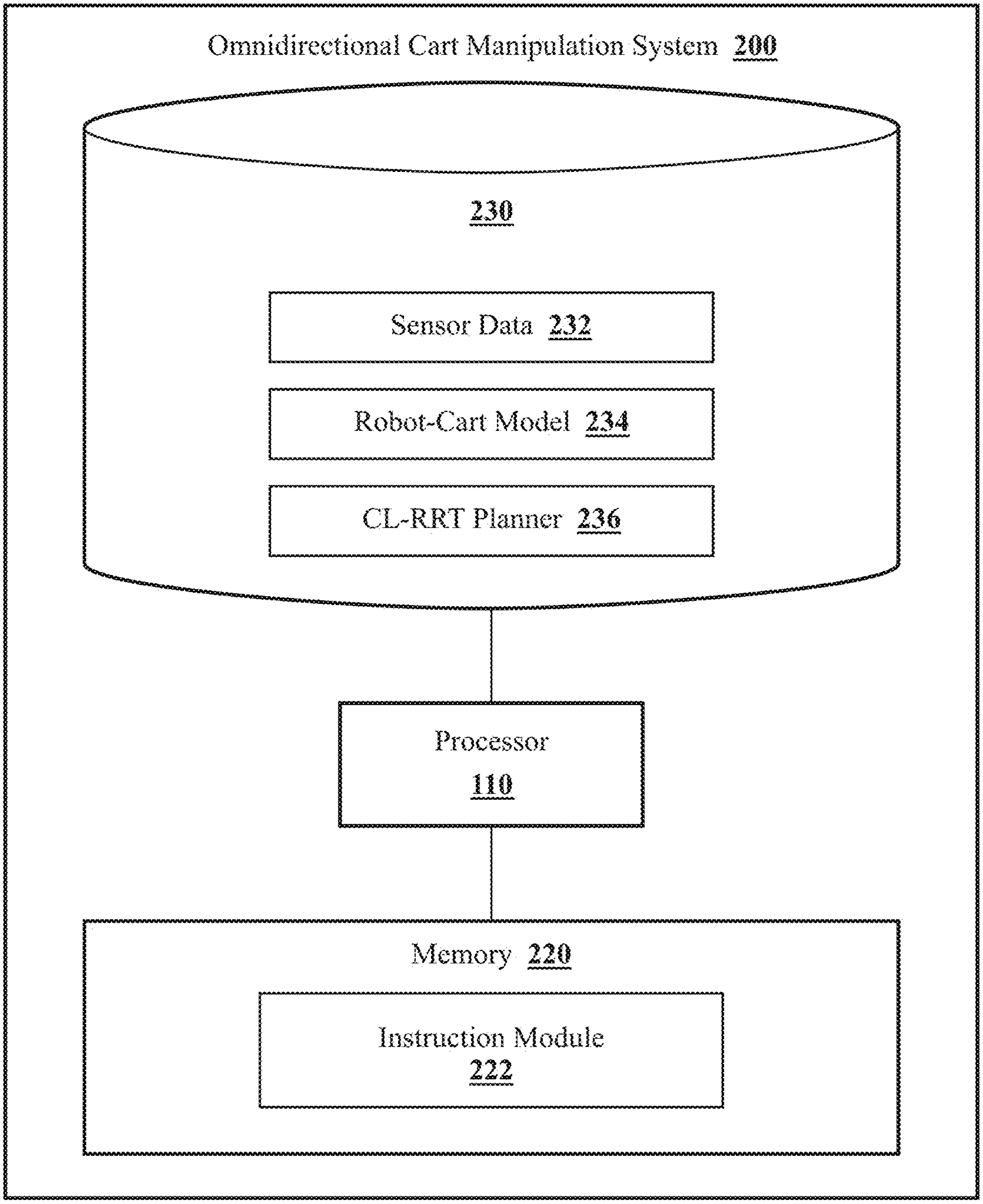
FIG. 3 illustrates an omnidirectional cart manipulation system that may be incorporated within the armed mobile robot of FIG. 2.
Figure 4:
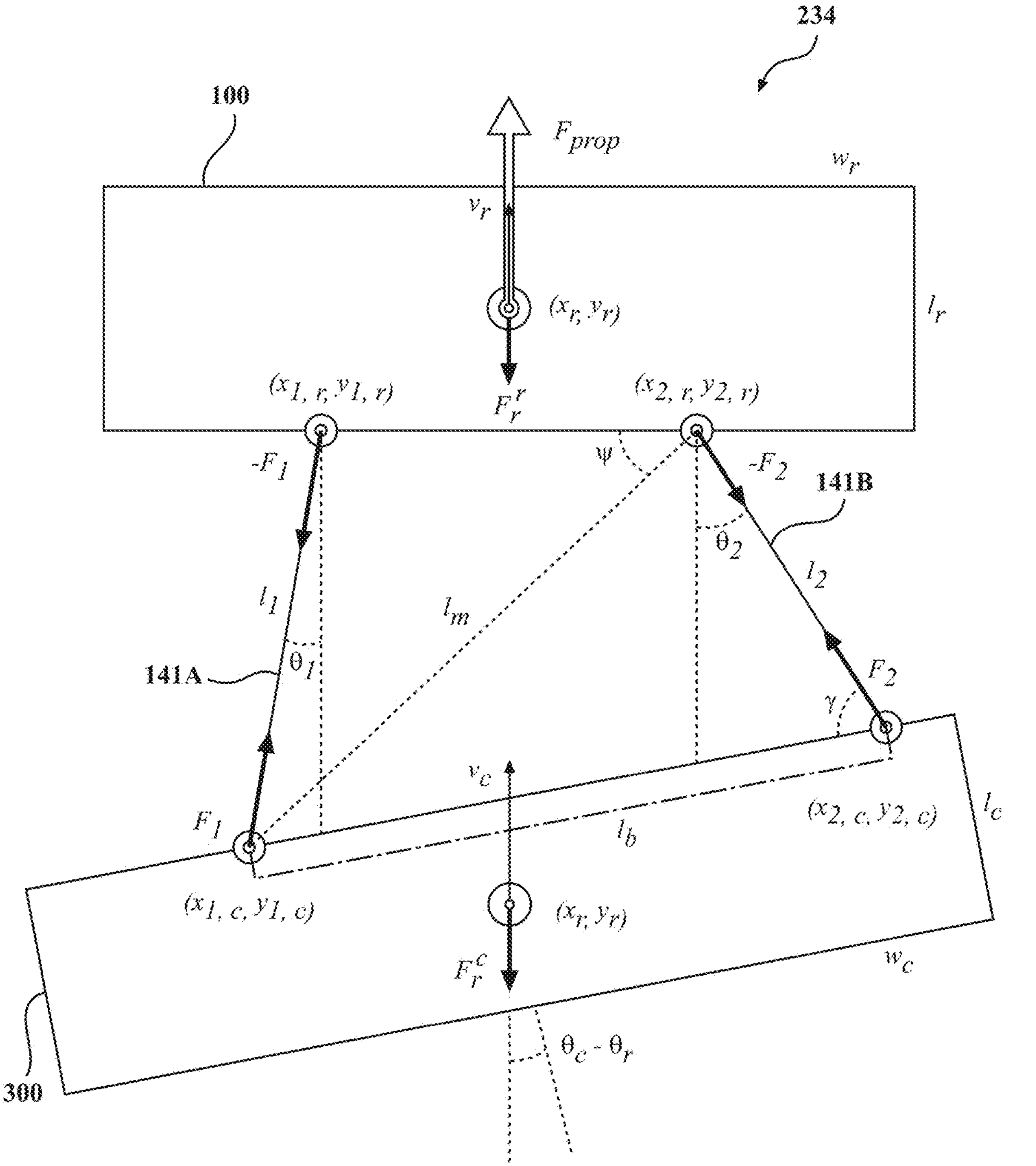
FIG. 4 illustrates a robot-cart model that models interconnected dynamics model between the omnidirectional cart and the armed mobile robot of FIG. 1.

In either case, as mentioned previously, the robot 100 includes the omnidirectional cart manipulation system 200. The omnidirectional cart manipulation system 200 considers the full interconnected dynamics model between an omnidirectional cart 300 and the robot 100 and uses these dynamics to optimize the planning and control algorithms for safe and efficient operation. With reference to FIG. 3, one embodiment of the omnidirectional cart manipulation system 200 is further illustrated. As shown, the omnidirectional cart manipulation system 200 includes a processor(s) 110. Accordingly, the processor(s) 110 may be a part of the omnidirectional cart manipulation system 200 or the omnidirectional cart manipulation system 200 may access the processor(s) 110 through a data bus or another communication path. In one or more embodiments, the processor(s) 110 is an application-specific integrated circuit that is configured to implement functions associated with an instruction module 222. In general, the processor(s) 110 is an electronic processor, such as a microprocessor, which is capable of performing various functions as described herein.

In one embodiment, the omnidirectional cart manipulation system 200 includes a memory 220 that stores the instruction module 222. The memory 220 is a random-access memory (RAM), read-only memory (ROM), a hard disk drive, a flash memory, or other suitable memory for storing the instruction module 222. The instruction module 222 is, for example, computer-readable instructions that, when executed by the processor(s) 110, cause the processor(s) 110 to perform the various functions disclosed herein.

Furthermore, in one embodiment, the omnidirectional cart manipulation system 200 includes a data store 230. The data store 230 is, in one embodiment, an electronic data structure such as a database that is stored in the memory 220 or another memory and that is configured with routines that can be executed by the processor(s) 110 for analyzing stored data, providing stored data, organizing stored data, and so on. Thus, in one embodiment, the data store 230 stores data used by the instruction module 222 in executing various functions.

In one embodiment, the data store 230 includes sensor data 232, a robot-cart model 234, and a CL-RRT planner 236. As will be explained later, the robot-cart model 234 models the interconnected dynamics between the omnidirectional cart 300 and the robot 100 and is used to generate a control input to control the movement of the robot 100 using the CL-RRT planner 236. The sensor data 232 may be data collected from one or more sensors of the robot 100. As will be explained later, the sensor data 232 can come from a variety of different sources, including cameras, sonar sensors, radar sensors, LIDAR sensors, and the like. The purpose of the sensor data 232 is to detect the location of objects, which may be static or dynamic in nature, and utilize that information to generate an appropriate control input to control the movement of the robot 100 as it manipulates the omnidirectional cart 300. By considering the location of objects, situations can be avoided wherein the robot 100 and/or the omnidirectional cart 300 come into contact with an external object.

As mentioned before, the instruction module 222 includes instructions that, when executed by the processor(s) 110, cause the processor(s) 110 to perform any of the functions described herein. These functions can include generating a control input to control the movement of the robot 100 when the robot 100 is manipulating the omnidirectional cart 300 with the goal of enabling safe and efficient transportation of objects in various environments. As will be explained, the instruction module 222 utilizes a CL-RRT planner 236 with MPC to enhance path planning for the robot 100 as it manipulates the omnidirectional cart 300.

Moreover, the CL-RRT planner 236 may receive as inputs the initial state of the robot 100 and the omnidirectional cart 300, the goal state of the robot 100 and the omnidirectional cart 300, and environment map that includes information on the surroundings, including obstacles and boundaries that may be generated by the sensor data 232 and/or map data, the robot-cart model 234 that models interconnected dynamics between the omnidirectional cart 300 and the robot 100, and/or feedback data that may include real-time sensor data that provides information about the current state of the robot 100 and/or the omnidirectional cart 300 and any changes in the environment. These inputs allow the CL-RRT planner 236 to generate and continuously adjust a feasible path for the robot 100 and/or the omnidirectional cart 300 to follow, ensuring it can navigate efficiently and safely in a dynamic environment.

As mentioned, the robot-cart model 234 models the interconnected dynamics of the robot 100 and the omnidirectional cart 300. In order to better understand the robot-cart model 234, reference is made to FIG. 4, which illustrates the robot-cart model 234. The robot-cart model 234 can be described as follows:

$$\dot{x}^r = v_x^r, \tag{1}$$

$$\dot{y}^r = v_y^r,$$

$$v_x^r = \frac{F_p - F_1 - F_2 - F_r^r - F_r^c}{m_r},$$

$$\dot{\theta}_r = \omega_r,$$

-continued $$\dot{\omega}_r = \alpha_r,$$

$$\dot{i}_1 = u_3,$$

$$\dot{i}_2 = u_4,$$

$$\dot{\theta}_1 = \omega_1,$$

$$\dot{\omega}_1 = u_5,$$

$$\dot{\theta}_2 = \omega_2,$$

$$\dot{\omega}_2 = u_6,$$

where $x=(x_r, y_r, v_r, \theta_r, x_c, y_c, v_{c,x}, v_{c,y}, \theta_c, \omega_c, y_1, y_2)\in\mathbb{R}^{12}$ is the state vector with $(x_r, y_r)$ the location of the center of mass of the robot 100 in the XY plane (in m), and $v_r$ and $\theta_r$ its speed (in m/s) and heading angle (in radians), respectively. As to the omnidirectional cart 300, $(x_c, y_c)$ is the location of the center of mass of the omnidirectional cart 300 in the XY plane (in m), $v_{c,x}$, and $v_{c,y}$ are the velocities in the X- and Y-directions, respectively (in m/s), and $\theta_c$ and $\omega_c$ are the heading angle of the omnidirectional cart 300 (in radians) and its rate of change (in rad/s), and where $y_1$ and $y_2$ are the Y-coordinates of the points where the forces F1 and F2 are applied to the omnidirectional cart 300.

The control input vector (i.e., control input) is $u=(F_p, \omega_r, F_1, F_2, q_1, q_2)\in\mathbb{R}^6$, where $F_p$ is the pulsive force of the robot 100 (in N) in the direction of $\theta_r$, $\omega_r$ is the angular velocity of the robot, $F_1$ and $F_2$ are the forces applied by the robot 100 onto the omnidirectional cart 300 at locations $(x_1, y_1)$ and $(x_2, y_2)$ via the arms 141A and 141B, respectively. The other forces are $$F_r^r, F_r^c,$$

denote the external resistance forces on the robot and cart, respectively, due to, e.g., rolling friction, inclined terrain, etc. For parameters, $m_r$ and $m_c$ are the masses of the robot 100 and omnidirectional cart 300, respectively (in kg), and $$I_z = \frac{1}{12} m_c (a^2 + b^2),$$

where a and b are the length and width of the omnidirectional cart 300 from an overhead perspective, respectively (in m).

One assumption that may be made is that the arms 141A and 141B of the robot 100 may be in a fixed location, i.e., $(x_{1,r}, y_{1,r})$ and $(x_{2,r}, y_{2,r})$ are fixed relative to $(x_r, y_r)$. The following are derived quantities used in the dynamics model:

$$d_a = \sqrt{(x_{1,r} - x_{2,r})^2 + (y_{1,r} - y_{2,r})^2}, \tag{2}$$

$$l_m = \sqrt{l_1^2 + d_a^2 - 2 l_1 d_a \cos\left(\frac{\pi}{2} + \theta_1\right)}, \tag{3}$$

$$\psi = \arcsin\left(\frac{l_1 \sin\left(\frac{\pi}{2} + \theta_1\right)}{l_m}\right) \tag{4}$$

$$l_b = \sqrt{l_m^2 + l_2^2 - 2 l_m l_2 \cos\left(\frac{\pi}{2} + \theta_2 - \psi\right)} \tag{5}$$

-continued $$\gamma = \arcsin\left(\frac{l_m \sin\left(\frac{\pi}{2} + \theta_2 - \psi\right)}{l_b}\right), \tag{6}$$

$$\theta_c = \theta_r - \frac{\pi}{2} + \theta_2 + \gamma. \tag{7}$$

Equation (2) is the Euclidean distance between $(x_{1,r}, y_{1,r})$ and $(x_{2,r}, y_{2,r})$, equations (3) and (5) were derived using the Law of Cosines, and equations (4) and (6) were derived using the Law of Sines.

As to computing torques, let $\beta_1=\theta_r+\theta_1+\pi$, $\beta_2=\theta_r+\theta_2+\pi$. The following expressions give the resultant torques around the points $(x_{1,r}, y_{1,r})$ and $(x_{2,r}, y_{2,r})$:

$$\tau_1^r = (x_{1,r} - x_r)F_1 \sin\beta_1 - (y_{1,r} - y_r)F_1 \cos\beta_1, \tag{8}$$

$$\tau_2^r = (x_{2,r} - x_r)F_2 \sin\beta_2 - (y_{2,r} - y_r)F_2 \cos\beta_2. \tag{9}$$

As to determining $F_1$ and $F_2$, let $\vec{F}_m=\lambda_1(-\sin\theta_r\hat{i}+\cos\theta_r\hat{j})$ (which stands for motion constraint and was derived using Lagrangian dynamics). The following are the equations of motion for the robot 100, the omnidirectional cart 300, and when the robot 100 is manipulating the omnidirectional cart 300:

$$m_r a_r = F_p + \vec{F}_r^r + \vec{F}_m - \vec{F}_1 - \vec{F}_2 \tag{10}$$

$$m_c \vec{a}_c = \vec{F}_1 + \vec{F}_2 + \vec{F}_r^c \tag{11}$$

$$(m_r + m_c)\vec{a}_r = \vec{F}_p + \vec{F}_r^r + \vec{F}_m + \vec{F}_r^c \tag{12}$$

where $$\vec{F}_p = u_1(\cos\theta_r\hat{\imath} + \sin\theta_r\hat{\jmath})$$

$$F_r = -c_{rr}v_{x,r}(\cos\theta_r\hat{\imath} + \sin\theta_r\hat{\jmath}).$$

Solving for $\vec{a}_r$, the following expression is obtained:

$$\vec{F}_1 + \vec{F}_2 = \frac{m_c\left(\vec{F}_p + \vec{F}_r^r + \vec{F}_m\right) - m_r\vec{F}_r^c}{m_r + m_c}.$$

Then, using the following moment balance equations, $$I_z^r\vec{\alpha}_r = \vec{\tau}_1^r + \vec{\tau}_1^r \tag{13}$$

$$I_z^{r+c}\vec{\alpha}_r = \vec{r}_{c\gamma} \times \vec{F}_r^c, \tag{14}$$

the following equations for $\vec{F}_1$ and $\vec{F}_2$ can be obtained:

$$\vec{F}_1 = \frac{P - QG_2}{G_1 - G_2} \tag{15}$$

$$\vec{F}_2 = \frac{QG_1 - P}{G_1 - G_2} \tag{16}$$

where $$P = \frac{I_z^r}{I_z^{r+c}}[-(x_c - x_r)F_r^c \sin\theta_c + (y_c - y_r)F_r^c \cos\theta_c], \tag{17}$$

-continued $$Q = \frac{m_c\left(\vec{F}_p + \vec{F}_r^r + \vec{F}_m\right) - m_r\vec{F}_r^c}{m_r + m_c} \tag{18}$$

$$G_1 = (x_{1,r} - x_r)\sin\beta_1 - (y_{1,r} - y_r)\cos\beta_1, \tag{19}$$

$$G_2 = (x_{2,r} - x_r)\sin\beta_2 - (y_{2,r} - y_r)\cos\beta_2. \tag{20}$$

The robot-cart model 234 may be expressed in manipulator form, i.e., $$M(q)\ddot{q} = \tau + \frac{\partial h^\top}{\partial \dot{q}}\lambda, \tag{21}$$

where $$M(q) = \begin{bmatrix} m_r & 0 & 0 \\ 0 & m_r & 0 \\ 0 & 0 & I_z^r \end{bmatrix}, \tag{22}$$

$$\frac{\partial h}{\partial \dot{q}} = [-\sin\theta_r \quad \cos\theta_r \quad 0], \tag{23}$$

$$\lambda = [\lambda_1], \tag{24}$$

and $\tau$ represents the generalized forces, i.e., $$\tau = \left[\sum F_x \quad \sum F_y \quad \sum \tau_i\right]^\top.$$

A closed closed-form expression for $\lambda$ may be obtained as:

$$\lambda = -\left(\frac{\partial h^\top}{\partial \dot{q}}M^{-1}\frac{\partial h}{\partial \dot{q}}\right)^\dagger\left[\frac{\partial h^\top}{\partial \dot{q}}M^{-1}\tau + \frac{\partial h}{\partial q}\dot{q} + ah\right], \tag{25}$$

where a>0 is a stiffness parameter.

As mentioned before, the robot-cart model 234 can be utilized by the CL-RRT planner 236 to determine an appropriate trajectory that the robot 100 should utilize when manipulating the omnidirectional cart 300. However, it should be understood, then still utilizing the CL-RRT planner 236, other methodologies may be employed to determine the appropriate trajectory. For example, a neural network and/or a reinforcement learning agent could be utilized to determine the trajectory for the robot 100 instead of the CL-RRT planner 236.

The CL-RRT planner 236 may be an advanced path-planning algorithm designed for mobile robots, such as the robot 100, navigating complex environments. Unlike traditional RRT algorithms, which generate paths by randomly sampling the space and connecting these samples to form a tree, the CL-RRT incorporates feedback from the current state of the robot 100 and/or the omnidirectional cart 300 to refine and optimize the path in real-time. This closed-loop approach allows the CL-RRT planner 236 to account for dynamic changes in the environment and the motion constraints of the robot 100 and/or the omnidirectional cart 300, making it particularly effective for navigating cluttered or unpredictable spaces.

Moreover, the CL-RRT planner 236 may sample random points in the environment and extending a tree towards these points. At each step, the planner uses the robot-cart model 234 to simulate the motion of the robot 100 and the omnidirectional cart 300 the robot 100 is manipulating from its current state towards the sampled point. This simulation accounts for the kinematic and dynamic constraints of the robot 100 and the omnidirectional cart 300, ensuring that the resulting trajectory is physically achievable. If the simulated path is feasible and collision-free, it is added to the tree.

As mentioned previously, the omnidirectional cart manipulation system 200 may also incorporate MPC and PRA-CBFs, i.e., MPC+PRA-CBFs. Moreover, once a trajectory is determined by the CL-RRT planner 236 or using a neural network or reinforcement learning agent, MPC takes over to refine this trajectory in real-time. Moreover, MPC uses a predictive model to forecast future states over a finite time horizon. At each step, MPC solves an optimization problem to minimize a cost function, which typically includes terms for tracking the desired path, avoiding obstacles, and adhering to dynamic constraints. This allows the robot 100, when manipulating the omnidirectional cart 300, to adjust its trajectory dynamically based on current sensor data and environmental change.

The predicted state and control trajectories (the solutions to the MPC problem), the current state x, and control parameters theta are fed into the PRA-CBF control law that may apply one or more constraints, such as obstacle avoidance, collision avoidance, speed limit, etc. In one example, the objective function is the squared distance of the control input u* from the desired control at present, denoted $u_1^0$. The constraints in the optimization problem are PRA-CBF constraints, which are affine in the control input, and thus the optimization problem is a quadratic program ("QP") and takes the following form:

$$a(x_{0:N}, u_{1:N}) + b^{\top}(x_{0:N}, u_{1:N})u \geq \alpha\left(\mu(x_{0:N}, u_{1:N}) + verf^{-1}(1-\rho)\right) \quad (26)$$

where a: $\mathbb{R}^{nn\times(NN+1)} \times \mathbb{R}^{mm\times NN} \rightarrow \mathbb{R}$ and b: $\mathbb{R}^{nn\times(NN+1)} \times \mathbb{R}^{mm\times NN} \rightarrow \mathbb{R}^{mm}$ depend on the chosen CBF, the minimum predicted value of which over the considered time interval is given by μμ, and where αα: $\mathbb{R} \rightarrow \mathbb{R}$ is a class K function, νν∈$\mathbb{R}$ is a system-dependent robustness parameter, and ρρ∈(0,1) is the (designed) risk specification, such that the satisfaction of Equation 26 results in the probability of the system becoming unsafe being bounded from above by rho, a design specification. By layering this PRA-CBF as a filter for the nominal MPC policy and then using the PRA-CBF to evaluate the risk of these predicted trajectories, the omnidirectional cart manipulation system 200 is able to provide a more accurate assessment of the risk incurred by the system and ensure that it remains at an acceptable level. Any nominal control inputs not satisfying the above condition will be modified by the QP in order to meet the specification.

Figure 5:
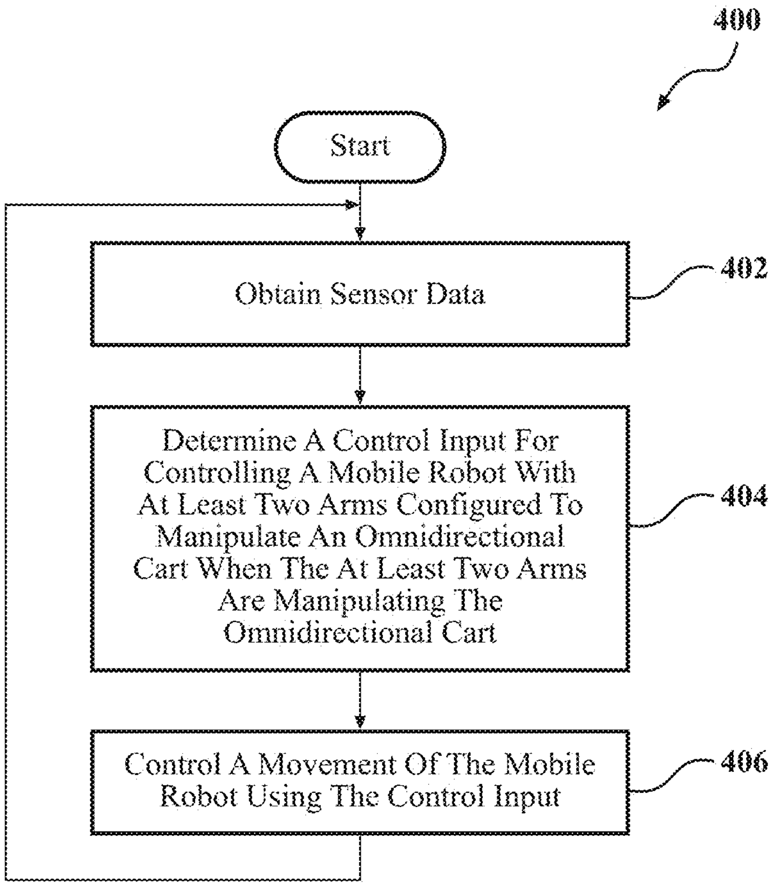
FIG. 5 illustrates a method of controlling an armed mobile robot to manipulate an omnidirectional cart.

Referring to FIG. 5, a method 400 for controlling a robot having a plurality of arms that can manipulate an omnidirectional cart is shown. The method 400 will be described from the viewpoint of the robot 100 of FIG. 1, the omnidirectional cart 300 of FIG. 1, and the omnidirectional cart manipulation system 200 of FIG. 3. However, it should be understood that this is just one example of implementing the method 400. While method 400 is discussed in combination with the omnidirectional cart manipulation system 200, it should be appreciated that the method 400 is not limited to being implemented within the omnidirectional cart manipulation system 200, but is instead one example of a system that may implement the method 400.

In step 402, the instruction module 222 causes the processor(s) 110 to obtain sensor data 232. The sensor data 232, as described previously, can originate from a number of different sources, including, but not limited to environment sensor(s) 122 shown in FIG. 2. The environment sensor(s) 122 can include any type of sensor, but in this example, they are shown to include radar sensor(s) 123, LIDAR sensor(s) 124, sonar sensor(s) 125, and camera(s) 126.

In step 404, the instruction module 222 causes the processor(s) 110 to determine a control input for controlling the robot 100 when manipulating the omnidirectional cart 300. Generally, the control input is based on the trajectory and state of the robot 100. As mentioned in the paragraphs above, the control input can be determined utilizing a robot-cart model 234 that models interconnected dynamics model between the omnidirectional cart 300 and the robot 100. In one example, the CL-RRT planner 236 utilizes the sensor data 232 and the robot-cart model 234 to determine a trajectory for the robot 100 when manipulating the omnidirectional cart 300. As explained previously, instead of utilizing the CL-RRT planner 236, other methodologies may also be utilized to obtain the trajectory, such as a neural network and/or a reinforcement learning agent.

Once the trajectories are determined, the trajectories may be provided to an MPC that uses the trajectory and the state of the robot 100 and/or the omnidirectional cart 300 to determine a predicted control input. The PRA-CBF may then be applied to the predicted control input to determine the final control input. By layering this PRA-CBF as a filter for the nominal MPC policy and then using the PRA-CBF to evaluate the risk of these predicted trajectories, the omnidirectional cart manipulation system 200 is able to provide a more accurate assessment of the risk incurred by the system and ensure that it remains at an acceptable level.

In step 406, the control input is then applied to the robot 100 so as to control the movement of the robot 100 and/or other hardware components of the robot 100 to manipulate the omnidirectional cart 300. After step 406, the method 400 may return to the beginning or end.

FIG. 2 will now be discussed as an example environment within which the system and methods disclosed herein may operate. As mentioned before, the robot 100 can be any type of mobile robot that can manipulate an omnidirectional cart, such as the omnidirectional cart 300. In this example, the robot 100 may include one or more robotic device(s) 140, such as arm(s) 141 and a propulsion system 146. As mentioned before, the robot 100 may include two arms 141, illustrated in FIG. 1 as arms 141A and 141B. The arm(s) 141 may include appropriate joint(s) 142, link(s) 143, effector(s) 144, actuator(s) 145, and the like. However, it should be understood that the arm(s) 141 may take a number of different forms and may include more, fewer, or different components from those mentioned. As to the propulsion system 146, the propulsion system 146 includes the appropriate hardware allowing the robot 100 to move. In some cases, the propulsion system 146 may include one or more wheels driven by one or more electric motors, engines, or other power sources capable of allowing and providing movement to the robot 100. Like before, other components may be utilized to allow the robot 100 to move.

The robot 100 can include one or more processor(s) 110. In one or more arrangements, the processor(s) 110 can be the main processor of the robot 100. For instance, the processor(s) 110 can be an electronic control unit (ECU). The robot 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data store(s) 115 can include map data 116. The map data 116 can include maps of one or more geographic areas. In some instances, the map data 116 can include information regarding the environment in which the robot 100 operates. For example, if the robot 100 is a robotic manipulator utilized in a warehouse, the map data 116 may include a map of the warehouse in which the robot 100 operates. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, including factory/building floors, paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include furniture, industrial machines, household appliances, trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the robot 100 is equipped with, including the capabilities and other information about such sensors. As will be explained below, the robot 100 can include the sensor system 120. The sensor data 119 can relate to one or more sensors of the sensor system 120. As an example, in one or more arrangements, the sensor data 119 can include information on one or more LIDAR sensor(s) 124 of the sensor system 120.

In some instances, at least a portion of the map data 116 and/or the sensor data 119 can be located in one or more data store(s) 115 located onboard the robot 100. Alternatively, or in addition, at least a portion of the map data 116 and/or the sensor data 119 can be located in one or more data store(s) 115 that are located remotely from the robot 100.

As noted above, the robot 100 can include the sensor system 120. The sensor system 120 can include one or more sensors. "Sensor" means any device, component, and/or system that can detect and/or sense something. The one or more sensors can be configured to detect and/or sense in real-time. As used herein, the term "real-time" means a level of processing responsiveness that a user or system senses as sufficiently immediate for a particular process or determination to be made or that enables the processor to keep up with some external process.

In arrangements in which the sensor system 120 includes a plurality of sensors, the sensors can work independently from each other. Alternatively, two or more of the sensors can work in combination with each other. In such cases, the two or more sensors can form a sensor network. The sensor system 120 and/or the one or more sensors can be operatively connected to the processor(s) 110, the data store(s) 115, and/or another element of the robot 100 (including any of the elements shown in FIG. 2). The sensor system 120 can acquire data of at least a portion of the external environment of the robot 100.

The sensor system 120 can include any suitable type of sensor. Various examples of different types of sensors will be described herein. However, it will be understood that the embodiments are not limited to the particular sensors described. The sensor system 120 can include one or more robotic device sensor(s) 121. The robotic device sensor(s) 121 can detect, determine, and/or sense information about the robot 100 itself. In one or more arrangements, the robotic device sensor(s) 121 can be configured to detect and/or sense position and orientation changes of the robot 100, such as, for example, based on inertial acceleration. In one or more arrangements, the robotic device sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The robotic device sensor(s) 121 can be configured to detect and/or sense one or more characteristics of the robot 100. In one or more arrangements, the robotic device sensor(s) 121 can include a speedometer to determine the current speed of the robot 100.

Alternatively, or in addition, the sensor system 120 can include one or more environment sensor(s) 122 configured to acquire and/or sense environment data. "Environment data" includes data or information about the external environment in which a robot 100 is located or one or more portions thereof. For example, the one or more environment sensor(s) 122 can be configured to detect, quantify, and/or sense obstacles in at least a portion of the external environment of the robot 100 and/or information/data about such obstacles. Such obstacles may be stationary objects and/or dynamic objects. The one or more environment sensor(s) 122 can be configured to detect, measure, quantify, and/or sense other things in the external environment of the robot 100.

Various examples of sensors of the sensor system 120 will be described herein. The example sensors may be part of the one or more environment sensor(s) 122 and/or the one or more robotic device sensor(s) 121. However, it will be understood that the embodiments are not limited to the particular sensors described.

As an example, in one or more arrangements, the sensor system 120 can include one or more radar sensor(s) 123, one or more LIDAR sensor(s) 124, one or more sonar sensor(s) 125, and/or one or more camera(s) 126. In one or more arrangements, the one or more camera(s) 126 can be high dynamic range (HDR) cameras, infrared (IR) cameras, and/or stereo cameras.

The robot 100 can include an input system 130. An "input system" includes any device, component, system, element, arrangement, or groups thereof that enable information/data to be entered into a machine. The input system 130 can receive an input from an operator of the robot 100. The robot 100 can include an output system 135. An "output system" includes any device, component, arrangement, or groups thereof that enable information/data to be presented to an operator of the robot 100.

The processor(s) 110 can be operatively connected to communicate with the robotic device(s) 140 and/or individual components thereof. For example, the processor(s) 110 can be in communication to send and/or receive information from the robotic device(s) 140 to control the movement, speed, maneuvering, heading, direction, etc. of the robot 100. The processor(s) 110 may control some or all of these robotic device(s) 140 and, thus, may be partially or fully autonomous.

The processor(s) 110 can be operatively connected to communicate with the robotic device(s) 140 and/or individual components thereof. For example, returning to FIG. 2, the processor(s) 110 can be in communication to send and/or receive information from the robotic device(s) 140 to control the movement, speed, maneuvering, heading, direction, etc. of the robot 100. The processor(s) 110 may control some or all of these robotic device(s) 140.

The robot 100 can include one or more modules, at least some of which are described herein. The modules can be implemented as computer-readable program code that, when executed by a processor(s) 110, implements one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural networks, fuzzy logic, or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but is not limited to, an electronic, magnetic, optical, electromagnetic, infrared, or semiconductor system, apparatus, device, or any suitable combination of the preceding. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the preceding. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the preceding. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. For example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims rather than to the preceding specification, as indicating the scope hereof.

What is claimed is:

1. A system comprising a memory having instructions that, when executed by a processor, cause the processor to:
- determine a control input for controlling a mobile robot with at least two arms configured to manipulate an omnidirectional cart, the control input being based on a trajectory and a state of the mobile robot when the at least two arms are manipulating the omnidirectional cart, wherein the state was determined using a robot-cart model that models interconnected dynamics between the omnidirectional cart and the mobile robot; and
- control a movement of the mobile robot using the control input.

2. The system of claim 1, wherein the memory further comprises instructions that, when executed by the processor, cause the processor to determine the trajectory using a closed-loop rapidly-exploring random tree planner.

3. The system of claim 1, wherein the memory further comprises instructions that, when executed by the processor, cause the processor to determine the trajectory using at least one of a neural network and a reinforcement learning agent.

4. The system of claim 1, wherein the memory further comprises instructions that, when executed by the processor, cause the processor to:
- determine a predicted control input using a model predictive control methodology that uses the trajectory and the state as inputs; and
- apply a predictive risk-aware control barrier function to the predicted control input to determine the control input.

5. The system of claim 4, wherein applying the predictive risk-aware control barrier function is implemented via a quadratic program.

6. The system of claim 4, wherein the predictive risk-aware control barrier function applies one or more constraints comprising at least one of an obstacle avoidance, a collision avoidance, and a speed limit.

7. The system of claim 1, wherein the state of the mobile robot includes at least one of a location, heading, and velocity.

8. A method comprising:
- determining a control input for controlling a mobile robot with at least two arms configured to manipulate an omnidirectional cart, the control input being based on a trajectory and a state of the mobile robot when the at least two arms are manipulating the omnidirectional cart, wherein the state was determined using a robot-cart model that models interconnected dynamics between the omnidirectional cart and the mobile robot; and
- controlling a movement of the mobile robot using the control input.

9. The method of claim 8, further comprising determining the trajectory using a closed-loop rapidly-exploring random tree planner.

10. The method of claim 8, further comprising determining the trajectory using at least one of a neural network and a reinforcement learning agent.

11. The method of claim 8, further comprising:
- determining a predicted control input using a model predictive control methodology that uses the trajectory and the state as inputs; and
- applying a predictive risk-aware control barrier function to the predicted control input to determine the control input.

12. The method of claim 11, wherein applying the predictive risk-aware control barrier function is implemented via a quadratic program.

13. The method of claim 11, wherein the predictive risk-aware control barrier function applies one or more constraints comprising at least one of an obstacle avoidance, a collision avoidance, and a speed limit.

14. The method of claim 8, wherein the state of the mobile robot includes at least one of a location, heading, and velocity.

15. A non-transitory computer-readable medium having instructions that, when executed by a processor, cause the processor to:
- determine a control input for controlling a mobile robot with at least two arms configured to manipulate an omnidirectional cart, the control input being based on a trajectory and a state of the mobile robot when the at least two arms are manipulating the omnidirectional cart, wherein the state was determined using a robot-cart model that models interconnected dynamics between the omnidirectional cart and the mobile robot; and control a movement of the mobile robot using the control input.

16. The non-transitory computer-readable medium of claim 15, further comprising instructions that, when executed by the processor, cause the processor to determine the trajectory using a closed-loop rapidly-exploring random tree planner.

17. The non-transitory computer-readable medium of claim 15, further comprising instructions that, when executed by the processor, cause the processor to determine the trajectory using at least one of a neural network and a reinforcement learning agent.

* * * * *